Patented Sept. 12, 1944

2,358,107

UNITED STATES PATENT OFFICE 2,358,107

CONDITIONED REFRACTORY MATERIAL

Gilbert E. Seil, Cynwyd, Pa., assignor to E. J. Lavino and Company, Philadelphia, Pa., a corporation of Delaware No Drawing. Application February 28, 1942, Serial No. 432,909

2 Claims. (Cl. 106—61)

This invention relates to the making of conditioned refractory material and particularly to the making thereof from natural dolomitic starting material, thus rendering available low priced raw materials of rather wide distribution, that hitherto were considered generally as being unsuitable for this highly specialized field.

Natural dolomite or dolomitic materials comprise essentially lime magnesia and carbonic acid or carbon dioxide, which is lost on heating along with minor quantities of other substances which for the purpose of this invention can be ignored. By heat treating such dolomite, with a calculated amount of silica ($SiO_2$) its magnesia is converted into crystallized magnesia or periclase. Periclase is an excellent refractory material but something has to be done with the lime (CaO) content of the dolomite to render it more inactive to chemical reaction, especially such reactions as those which the refractory material is designed to resist. Therefore, an object of this invention is to condition dolomitic material to render from it a material that is highly refractory and chemically inactive. This object is attained by treating a mixture of lime, magnesia and silica under such conditions that there is realized therefrom, a mass of periclase crystals in a matrix that contains at least calcium silicate, which mass is produced by a particular heat-treatment that has the function of decreasing the proportion of lime and silica to the periclase present in the end product. In other words, this invention proposes heat treating the starting mixture so that in the end product the residual periclase is present in a proportion that is greater with respect to the lime and silica than existed in the starting mixture.

The invention, then, comprises using a dolomitic starting mixture whose essential constituents of lime, magnesia and silica have been corrected to a critical proportion, by subjecting the corrected mixture to a critical temperature above which such a mixture loses lime and silica. The result is that by the practice of this invention, a refractory grog can be made from dolomitic starting materials that is high in periclase and low in combined lime and silica, with the residual lime and silica being chemically combined into a calcium silicate matrix that is substantially stabilized against inversion or degradation.

In the practice of this invention, one step includes the mixing with dolomitic starting material, a silica yielding material such as silica sand, in a carefully calculated amount. The calculation preferably should be such that the silica content of the added material shall have a relation to the lime of the dolomite such that the lime to silica ratio, on a molecular basis, lies between 1.5:1 and 2:1. If the 2:1 ratio be used, after the heat treatment described herein, all of the residual lime and the silica will combine to yield calcium silicate, such as di-calcium silicate that is a compound sometimes called calcium orthosilicate ($2CaO.SiO_2$), that is in stabilized condition which comprises a good companion refractory constituent for the periclase.

If the 1.5:1 ratio be used, after said heat treatment, the residual lime and silica, and some of the magnesia present, will combine to yield calcium orthosilicate and monticellite ($CaO.MgO.SiO_2$)

Therefore, the 1.5:1 and the 2:1 ratios are unreached limits as this invention is preferably to be practiced, because if the silica added lies between those unreached limits, some calcium silicate will be formed and so will some monticellite. However, it is helpful if the relative proportion of the stabilized calcium silicate be major while that of the monticellite be minor, for naturally the more calcium silicate there is in proportion to the monticellite, the more refractory will be the end product.

Another important feature is that there shall be no residual free lime or residual free silica. Likewise the calcium silicate present should be in stabilized condition.

After the dolomite has been mixed with the calculated amount of silica yielding material comes the most important part of this invention, namely, the disappearance of both lime and silica from the mix either in part or in whole, whereby the mixture has its lime and silica content reduced. Another way of saying this is that by such treatment, the ratio of magnesia to lime is increased in the mix, and the ratio of magnesia to silica is increased. This removal is accomplished by subjecting the mix to a temperature that is above a critical point. From a practical standpoint, that critical temperature is 3200° F. That temperature must be stated in that way because such high temperatures cannot be measured accurately so the precise critical temperature may be 50° F. on either side of 3200° F.

If such a mix be heated to a temperature of 3100° F. (as nearly as it can be measured) stabilized calcium orthosilicate is yielded along with the periclase, plus the monticellite mentioned, but in general there is no loss of constituents observable. However, if the mix be heated to 3200° F.

or higher, an observable loss of lime and silica takes place, and that loss increases rapidly as the temperature is raised above 3200° F.

If the mix is heated to temperatures up to 3100° F. there is no change of proportions of the constituents of the mix, whereas when the mix is subjected to a temperature of 3200° F. or higher, lime and silica disappear from the mix so that the percentage of lime and silica with respect to periclase decreases, which can be said in another way, namely, that proportion of periclase increases as compared with the remaining lime and silica.

The temperature above 3200° F. to which the mix should be heated is dependent generally upon the temperature of the environment in which the refractory is to be used. That is, if the refractory is to be used to resist a general or average temperature in excess of 3200° F., a factor of safety should be used of, say, 200° to 300° F. That is, if the refractory is to be used in a heat condition that averages 3200° F. then the mix should be heated to, say, 3500° F. The reason for this is that whereas the average or general temperature may be only 3200° F., in furnaces and like heated zones, there are apt to be localized zones of superheat that exceed the general or average temperature. The refractories must be able to withstand even these zones of superheat so this explains the desirability of using the factor of safety in the temperature above 3200° F. to which the mix should be fired. If, however, the refractories are to be used in a heated zone that does not exceed 2900° or 3000° F., then, of course, even with the factor of safety, the mix need only be heated to at least the critical temperature of 3200° F. The price one pays for heating the mix above the 3200° F. level is the loss of weight from the mix, which seems to increase very rapidly and progressively as 3200° F. is exceeded. So far as I can foresee, if the temperature were raised high enough, and it was otherwise desirable, all of the lime and silica could be lost, leaving residually only periclase.

I have further found that the removal of lime and silica, under the heat treatment specified, is or can be accelerated by the presence in the mix of one or more additives such as $Fe_2O_3$, $Al_2O_3$, $Cr_2O_3$ and chrome ore.

My United States Patent No. 2,207,557, for example, describes a refractory body made by adding to a dolomitic starting material a calculated amount of silica to yield a starting mixture in which the molecular ratio of CaO to $SiO_2$ is between 1 mole of CaO to 1 mole of $SiO_2$ and 2 moles of CaO to 1 mole of $SiO_2$ and firing the mixture to a temperature of 3100° F. to yield a refractory body comprising periclase and stabilized calcium orthosilicate, or periclase and monticellite, or periclase, stabilized calcium orthosilicate and monticellite. Such a refractory has a place in the refractory industry in service in which the temperature does not go appreciably higher than 3100° F. But I have discovered that when refractory bodies of the type covered by my aforementioned patent are heated to temperatures in excess of 3200° F., both lime and silica are lost, as can be seen, for example, from the following data, of one series of tests, wherein the corrected dolomite refractory of my above mentioned patent, which had previously been fired at 3100° F., was re-fired to a temperature in excess of 3200° F. Three samples were analyzed before the treatment, while three samples were analyzed after the treatment, and the results are tabulated below:

Table I

|  | $Fe_2O_3$ | $Al_2O_3$ | $SiO_2$ | CaO | MgO | Ignition loss at 2000° F. |
|---|---|---|---|---|---|---|
| Analysis of body before treatment above 3200° F. | 0.92 | 0.20 | 24.84 | 39.97 | 29.61 | 1.98 |
|  | 0.80 | 0.48 | 24.74 | 40.11 | 29.55 | 1.67 |
|  | 0.84 | 0.37 | 25.00 | 39.76 | 30.17 | 2.00 |
| Average | 0.85 | 0.35 | 24.86 | 39.95 | 29.78 | 1.88 |
| Analysis of residue after treatment above 3200° F. | 1.92 | 1.43 | 17.30 | 29.40 | 45.07 | 0.22 |
|  | 1.52 | 1.73 | 17.26 | 29.40 | 44.98 | 0.32 |
|  | 0.88 | 1.68 | 17.50 | 29.26 | 45.18 | 0.20 |
| Average | 1.44 | 1.61 | 17.35 | 29.35 | 45.08 | 0.25 |

The above analyses recalculated to put all weights on the basis of 100 parts by weight of MgO are tabulated below:

Table II

|  | Parts per weight per 100 parts of MgO | | | | |
|---|---|---|---|---|---|
|  | $Fe_2O_3$ | $Al_2O_3$ | $SiO_2$ | CaO | MgO |
| Analysis of body before treatment above 3200° F. | 3.11 | 0.67 | 83.88 | 134.96 | 100.00 |
|  | 2.71 | 1.62 | 83.72 | 135.73 | 100.00 |
|  | 2.78 | 1.23 | 82.85 | 134.76 | 100.00 |
| Average | 2.87 | 1.17 | 83.48 | 135.16 | 100.00 |
| Analysis of residue after treatment above 3200° F. | 4.26 | 3.17 | 38.39 | 65.23 | 100.00 |
|  | 3.38 | 3.85 | 38.37 | 65.36 | 100.00 |
|  | 1.95 | 3.72 | 38.73 | 64.75 | 100.00 |
| Average | 3.20 | 3.58 | 38.50 | 65.11 | 100.00 |

The data in Table II recalculated on the basis of moles of MgO is given below:

Table III

|  | Moles per mole of MgO | | | | |
|---|---|---|---|---|---|
|  | $Fe_2O_3$ | $Al_2O_3$ | $SiO_2$ | CaO | MgO |
| Analysis of body before treatment above 3200° F. | .007 | .003 | 0.56 | 0.96 | 1.00 |
|  | .007 | .006 | 0.56 | 0.97 | 1.00 |
|  | .007 | .005 | 0.55 | 0.96 | 1.00 |
| Average | .007 | .005 | 0.56 | 0.96 | 1.00 |
| Analysis of residue after treatment above 3200° F. | .011 | .012 | 0.26 | 0.47 | 1.00 |
|  | .008 | .015 | 0.26 | 0.47 | 1.00 |
|  | .005 | .014 | 0.26 | 0.46 | 1.00 |
| Average | .008 | .014 | 0.26 | 0.47 | 1.00 |

From the above results, it is apparent that:

1. (Refer to Table I) On a percentage basis, the residue is higher in MgO, lower in lime and lower in silica than the starting material. Comparing the residue to the starting material on this basis, the MgO has been increased from 29.78% to 45.08%—a gain of 15.30%, the CaO has been decreased from 39.95% to 29.35%—a loss of 10.60%, and the $SiO_2$ has been decreased from 24.86% to 17.35%—a loss of 7.51%.

2. (Refer to Table II) Considering the weight of MgO as a constant, and basing all weights on 100 parts by weight of MgO: the starting material had 135 pounds of CaO for each 100 pounds of MgO, the residue had 65 pounds of CaO for each 100 pounds of MgO—a loss of 70 pounds of CaO for each 100 pounds of MgO, and the starting material had 83.5 pounds of $SiO_2$ for each 100 pounds of MgO and the residue had 38.5 pounds of $SiO_2$ for each 100 pounds of MgO—a loss of 45 pounds of $SiO_2$ for each 100 pounds of MgO.

3. (Refer to Table III) Considering the MgO as a constant, and recalculating the data in Table II to establish the molecular relationship of the reacting compounds to one molecule of MgO: the starting material had 0.96 mole of CaO for each mole of MgO and the residue had 0.47 mole of CaO for each mole of MgO—a loss of 0.30 mole of CaO for each mole of MgO, and the starting material had 0.56 mole of $SiO_2$ for each mole of MgO and the residue had 0.26 mole of $SiO_2$ for each mole of MgO—a loss of 0.30 mole of $SiO_2$ for each mole of MgO.

4. The residual product is appreciably higher in MgO than the starting material which was the source of MgO, the proportion of CaO to MgO as compared to the proportion of CaO to MgO in the starting mixture is appreciably reduced, and the proportion of $SiO_2$ to MgO as compared to the proportion of $SiO_2$ to MgO in the starting mixture is appreciably reduced.

The discovery that lime and silica are lost when mixtures containing appreciable amounts of magnesia, lime and silica are heated to temperatures above 3200° F. is the basis for the present invention. I have further discovered that the amounts of lime and silica lost are increased as the temperature above 3200° F. is increased. The residue is a high magnesia body containing lime and silica, which is stable and which will not undergo further change on reheating to the temperature of the treatment. The residue is a dense clinker, substantially free from residual shrinkage, which can be used for the manufacture of refractories for use in service at temperatures less than the temperature of treatment. Thus by the practice of my invention I can provide a refractory material for service at any given temperature by heating my starting mixture to a temperature 200° F. to 300° F. in excess of the service temperature, in this way providing a factor of safety against physical and chemical change in the refractory body during exposure to the conditions it has been designed to resist.

My further discovery that the presence of certain materials, as for example, $Fe_2O_3$, $Al_2O_3$, $Cr_2O_3$ and chrome ore, in the starting mixture, either as naturally occurring impurities or as purposely included additives, accelerate the rate of removal of lime and silica from the starting mix is shown, for example, in tests using 90 parts by weight of a starting material similar to that described in Tables I, II and III, and 10 parts by weight of an $Fe_2O_3$ yielding material, such as, for example, aniline sludge or iron ore, the following results, tabulated as are the results in Tables I, II and III, were obtained:

Table IV

| | $Fe_2O_3$ | $SiO_2$ | CaO | MgO |
|---|---|---|---|---|
| CHEMICAL ANALYSES | | | | |
| Before treatment | Per cent 13.6 | Per cent 27.1 | Per cent 33.4 | Per cent 24.7 |
| After treatment at 3240° F. | 9.0 | 4.4 | 5.6 | 80.5 |
| PARTS BY WEIGHT COMPARED TO 100 PARTS BY WEIGHT OF MgO | | | | |
| Before treatment | 55.1 | 109.8 | 135.3 | 100.0 |
| After treatment at 3240° F. | 11.2 | 5.5 | 6.9 | 100.0 |
| MOLECULAR ANALYSES COMPARED TO MOLES OF MgO | | | | |
| Before treatment | 0.14 | 0.73 | 0.97 | 1.00 |
| After treatment at 3240° F. | 0.03 | 0.04 | 0.05 | 1.00 |

On a percentage basis, the residual product is much higher in MgO, and much lower in both lime and in silica than the starting material. As a matter of fact, the product of this run has an excellent analysis for maintenance grade refractory magnesite. The loss of lime and silica in proportion to the MgO is greater than in the case where there were no appreciable amounts of $Fe_2O_3$ in the mixture.

A mixture of 80 parts by weight of dolomitic magnesite and 20 parts by weight of chrome ore, treated in accordance with the process of this invention gave the results shown below:

Table V

| | $Cr_2O_3$ | Total Fe as FeO | $Al_2O_3$ | $SiO_2$ | CaO | MgO |
|---|---|---|---|---|---|---|
| CHEMICAL ANALYSES | | | | | | |
| Before treatment | Per cent 7.87 | Per cent 9.41 | Per cent 3.20 | Per cent 4.66 | Per cent 11.66 | Per cent 60.98 |
| After treatment at 3200° F. | 8.35 | 8.84 | 2.38 | 2.31 | 6.23 | 69.79 |
| PARTS BY WEIGHT COMPARED TO 100 PARTS BY WEIGHT MgO | | | | | | |
| Before treatment | | | | Pounds 7.6 | Pounds 19.1 | Pounds 100 |
| After treatment at 3200° F. | | | | 3.3 | 8.9 | 100 |
| MOLECULAR ANALYSES COMPARED TO MOLES OF MgO | | | | | | |
| Before treatment | | | | 0.05 | 0.14 | 1.0 |
| After treatment at 3200° F. | | | | 0.02 | 0.06 | 1.0 |

By the treatment the residual product has been increased in MgO from about 60% to about 70% as compared to the starting material. On the basis of 100 pounds of MgO, the lime (CaO) in the residual product has been reduced from 19.1# to 8.9# as compared to the starting material, a loss of 10.2# or 53.4%, and at the same time the silica in the residual product has been reduced from 7.6# to 3.3# as compared to the starting material, a loss of 4.3# or 56.6%. Thus on the basis of 100# of MgO, over one-half the lime and over one-half the silica have been lost. On a molecular basis, compared to one mole of MgO, the residual product has .06 mole of CaO compared to 0.14 mole in the starting material, a loss of .08 mole, while the $SiO_2$ on the same basis is reduced from .05 mole to .02 mole.

The range of proportions of all of the additives that can be used as accelerators is wide and can be varied with the amount of the additive desired in the finished product. For example, the proportion of $Fe_2O_3$ added can vary from 2% to 50% of the starting mixture. The amount of $Al_2O_3$ added can vary from 2% to 50% of the starting mixture. The amount of chrome ore which can be used depends upon the chemical analysis of the chrome ore and amounts of chrome ore which will introduce percentages of $Cr_2O_3$ between 2% and 40% can be used. If $Cr_2O_3$ is used the percentage can vary from 2% to 40% of the starting mixture.

One method of practicing the invention is as follows: A dolomitic material and a silica-yielding material such as, for example, silica sand, or a dolomitic material and a material yielding both MgO and $SiO_2$ such as, for example, the serpentine minerals, are used as starting materials. If a product containing $Fe_2O_3$, $Al_2O_3$, or chromite is desired, additives to yield one or more of the desired additives are included in the starting mixture. The presence of such additives increases the rate of reaction and lowers the temperature of reaction.

The application of the process of this invention to removal of the lime from dolomitic materials has been described in detail but I have also discovered that an analogous reaction occurs when the remaining alkaline earth oxides, namely, strontium oxide and barium oxide are substituted for the lime and treated in the presence of MgO in accordance with the process of my invention, although the critical temperature decreases somewhat as the molecular weight of the alkaline earth oxide increases. These are considered to include CaO which has the lowest molecular weight; SrO which has the next higher molecular weight; and BaO which has the highest molecular weight of the oxides in the group. In Tables VI and VII are given the results of two series of tests on mixtures of BaO, $SiO_2$, and MgO:

Table VI

| | BaO | $SiO_2$ | MgO |
|---|---|---|---|
| CHEMICAL ANALYSES | | | |
| | Per cent | Per cent | Per cent |
| Before treatment | 58.78 | 23.28 | 15.60 |
| After treatment at 3100° F | 21.43 | 8.36 | 69.59 |
| PARTS BY WEIGHT COMPARED TO 100 PARTS BY WEIGHT OF MgO | | | |
| | Pounds | Pounds | Pounds |
| Before treatment | 370 | 149 | 100 |
| After treatment at 3100° F | 31 | 12 | 100 |
| MOLECULAR ANALYSES COMPARED TO MOLES OF MgO | | | |
| Before treatment | 0.97 | 0.99 | 1.0 |
| After treatment at 3100° F | 0.08 | 0.08 | 1.0 |

Table VII

| | BaO | $SiO_2$ | MgO |
|---|---|---|---|
| CHEMICAL ANALYSES | | | |
| | Per cent | Per cent | Per cent |
| Before treatment | 39.40 | 30.04 | 30.29 |
| After treatment at 3100° F | 7.25 | 22.18 | 69.43 |
| PARTS BY WEIGHT COMPARED TO 100 PARTS BY WEIGHT OF MgO | | | |
| | Pounds | Pounds | Pounds |
| Before treatment | 130 | 99 | 100 |
| After treatment at 3100° F | 10.4 | 32 | 100 |
| MOLECULAR ANALYSES COMPARED TO MOLES OF MgO | | | |
| Before treatment | 0.34 | 0.65 | 1.0 |
| After treatment at 3100° F | 0.03 | 0.21 | 1.0 |

The critical temperature of treatment in the above experiments is 3100° F.

Referring to Table VI—On a percentage basis the residual product is higher in MgO, lower in BaO and lower in $SiO_2$ than the starting material. Comparing the residual product to the starting material on this basis the MgO has been increased from 15.60% to 69.59%, the BaO has been reduced from 58.78% to 21.43%, and the $SiO_2$ has been reduced from 23.28% to 8.36%. Considering the weight of MgO as a constant and basing all weights on 100 parts by weight of MgO, the starting material had 370# of BaO for each 100# of MgO, the residual product has only 31# of BaO for each 100# of MgO, and the starting material had 149# of $SiO_2$ for each 100# of MgO while the residual product has 12# of $SiO_2$ for each 100# of MgO. On a molecular basis the moles of BaO for each mole of MgO have been decreased from .97 to .08 by the treatment while the moles of $SiO_2$ have been decreased from .99 to .08 by the treatment.

Referring to Table VII—On a percentage basis the residual product is higher in MgO, lower in BaO and lower in $SiO_2$ than the starting material. Comparing the residual product to the starting material on this basis the MgO has been increased from 30.29% to 69.43%, the BaO has been reduced from 39.40% to 7.25%, and the $SiO_2$ has been reduced from 30.04% to 22.18%. Considering the weight of MgO as a constant and basing all weights on 100 parts by weight of MgO, the starting material had 130# of BaO for each 100# of MgO, the residual product has only 10.4# of BaO for each 100# of MgO, and the starting material had 99# of $SiO_2$ for each 100# of MgO while the residual product has 32# of $SiO_2$ for each 100# of MgO. On a molecular basis the moles of BaO for each mole of MgO have been decreased from .34 to .03 by the treatment while the moles of $SiO_2$ have been decreased from .65 to .21 by the treatment.

The intimately mixed starting materials are preferably briquetted or pressed into adobes and then fired to a temperature in excess of 3200° F. Forming the mixture into a rigid body facilitates the chemical reaction because the reacting materials are held in close, intimate contact with each other. For a given mixture the final temperature of treatment, and the time the mixture is subjected to the final temperature determine the amount of lime (or other alkaline earth oxide) and silica which will be lost. The time and temperature of the treatment are varied in accordance with the results desired, thus to make a refractory body for use in a furnace which operates at 3200° F., treatment at 3500° F. is used. The refractory will then be stable at 3200° F. and there will be sufficient factor of safety to take care of localized heating effects in the furnace, which at times may cause the exposed surfaces of the brick to reach temperatures higher than 3200° F.

Various starting mixtures can be used. For instance, dolomite can be admixed with calculated amounts of serpentine, since the latter will provide the proper proportion of silica to the lime of the dolomite. Again, serpentine (natural magnesia silicate) can be used as a starting material with which is admixed a calculated amount of limestone, since the latter will provide the proper proportion of lime to the silica of the serpentine. The criterion from a chemical standpoint is to use a mixture that contains lime, magnesia and silica in the specified proportions. But practically or commercially, the cost of the starting materials enters into the selection of this material over that, so long as the chemical requirements are met.

A word may be said about the stability of the calcium orthosilicate. Stability against inversion from the unstable alpha form to the stable gamma form is meant. But that term as used has no meaning that relates to the loss of the calcium silicate or its constituents, due to the critical heat treatment. The stabilized calcium orthosilicate is formed when the temperature of the reactants is raised to approximately 3100° F. When the temperature is raised to 3200° F. or higher, lime and silica are lost, but whatever calcium silicate is left residually after that critical heat treatment always remains in stabilized form, and to effect this is the reason for the critical lime to silica ratios set forth herein as being essential in the starting mix.

From the heat treatment of the mix, there is obtained a clinker of stabilized refractory material whose primary refractory constituent is periclase that has a bonding or secondary refractory compound comprising stabilized calcium silicate. The refractory has all of its constituents in physical and chemical equilibrium. This clinker is then ground to suitable mesh size and is used as a grog for making into refractory bricks, cements or plastics. If the clinker is pressed into refractory shapes such as bricks, these shapes may be burned in the usual manner either in a periodic or in a tunnel kiln, or they may be used as unburned brick. High temperature resisting refractories are now usually made from magnesite as a starting material whereas equally good, if not better, refractories can be made from dolomite starting material by the practice of this invention. When it is recalled that the cost of magnesite is many times the cost of dolomite, the commercial advantages flowing from the practice of this invention are patent.

Having thus explained and exemplified my invention, to which examples the invention is by no means limited, I claim:

1. The process of forming refractory clinker that uses dolomitic starting material, which comprises effecting a ground mix of dolomite and a silica-yielding material in proportions such that lime and silica of the mix lie in a range of ratios on a molecular basis between 1.5:1 and 2:1, heating the mix to yield periclase and a quantity of stabilized calcium silicate, and then by heat treatment reducing in the mix the proportion of lime and of silica to magnesia with a concurrent increase in the content of MgO.

2. The process of forming refractory clinker that uses dolomitic starting material, which comprises effecting a ground mix of dolomite and silica in proportions such that lime and silica of the mix lie in a range of ratios on a molecular basis including 1.5:1 to 2:1; heating the mix to yield stabilized calcium orthosilicate, monticellite and periclase with the amount of calcium orthosilicate being greater than that of monticellite; and then by more intense heat treatment reducing in the mix the proportion of lime and of silica to magnesia with a concurrent increase in the content of MgO.

GILBERT E. SEIL.